(12) United States Patent
Nomichi et al.

(10) Patent No.: US 7,503,543 B2
(45) Date of Patent: Mar. 17, 2009

(54) GUIDE BODY, MANUFACTURING METHOD THEREOF, AND ELECTROMAGNETIC VALVE DEVICE

(75) Inventors: Kaoru Nomichi, Ono (JP); Makoto Ninomiya, Kobe (JP); Yutaka Suzuki, Kobe (JP); Yuko Funakubo, Kobe (JP)

(73) Assignee: Kabushiki Kaisha Kawasaki Precision Machinery, Kobe-shi (JP)

( * ) Notice: Subject to any disclaimer, the term of this patent is extended or adjusted under 35 U.S.C. 154(b) by 254 days.

(21) Appl. No.: 11/703,330

(22) Filed: Feb. 6, 2007

(65) Prior Publication Data

US 2008/0185543 A1    Aug. 7, 2008

(51) Int. Cl.
*F16K 31/02* (2006.01)

(52) U.S. Cl. .................. 251/129.15; 335/296
(58) Field of Classification Search ............ 251/129.15, 251/129.18; 335/296
See application file for complete search history.

(56) References Cited

U.S. PATENT DOCUMENTS

| | | | | |
|---|---|---|---|---|
| 4,947,893 A | * | 8/1990 | Miller et al. ............ | 137/625.65 |
| 5,571,248 A | * | 11/1996 | Seetharaman et al. .. | 137/625.65 |
| 6,612,544 B2 | * | 9/2003 | Sakata et al. ............ | 251/129.15 |
| 6,669,166 B2 | * | 12/2003 | Enomoto et al. ....... | 251/129.15 |

FOREIGN PATENT DOCUMENTS

JP    2002-231546    8/2002

* cited by examiner

*Primary Examiner*—John K Fristoe, Jr.
(74) *Attorney, Agent, or Firm*—Alleman Hall McCoy Russell & Tuttle, LLP (57) ABSTRACT

A guide body for an electromagnetic valve device is provided. The device includes a coil assembly surrounding the guide body, a plunger driven by magnetic force and slidably disposed inside the guide body. The guide body slidably guides the plunger in an open/close direction of the valve body along a guide face thereof. The guide body includes a first nonmagnetic section that supports a pole body and a part of the plunger at which the pole body and the plunger oppose each other, a second nonmagnetic section that supports the valve body, and extends at least throughout a sliding range of the valve body, and a magnetic section intermediate the first and second sections so that a portion of the lines of magnetic force passes therethrough. The guide face is formed so as to coaxially support the plunger and the valve body displaceable in the open/close direction.

5 Claims, 7 Drawing Sheets

GUIDE BODY, MANUFACTURING METHOD THEREOF, AND ELECTROMAGNETIC VALVE DEVICE

TECHNICAL FIELD

This invention relates to an electromagnetic valve device for driving a valve body by a magnetic force of a coil, and, particularly, to a guide body and a manufacturing method of the guide body for guiding the valve body.

BACKGROUND

Figure 1:
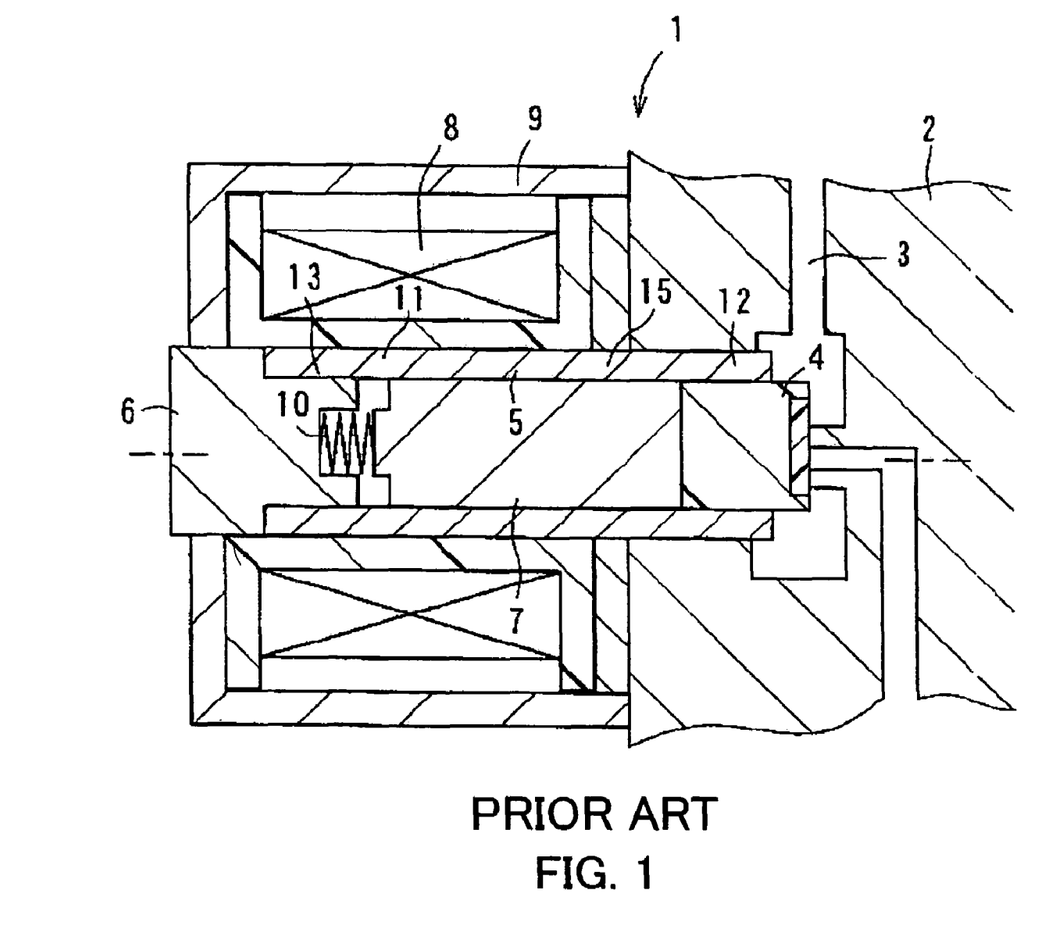
FIG. 1 is a cross-sectional view showing a prior art electromagnetic valve device.
Figure 2:
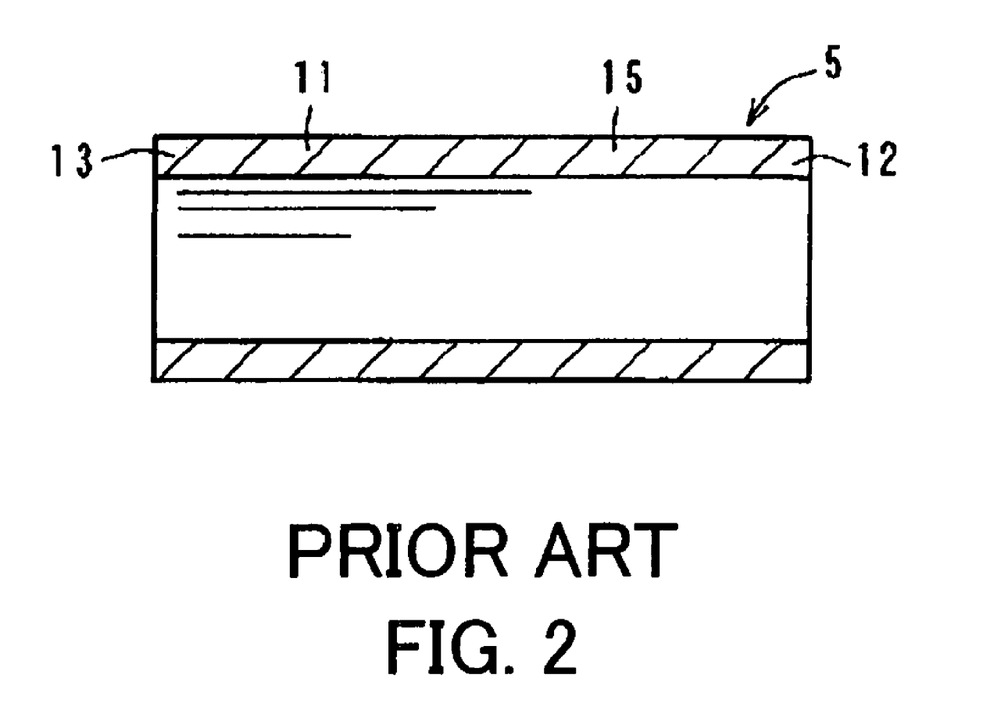
FIG. 2 is a cross-sectional view showing a guide body with which the electromagnetic valve device of FIG. 1 is equipped.

FIG. 1 is a cross-sectional view showing a prior art electromagnetic valve device 1. FIG. 2 is a cross-sectional view showing a guide body 5 with which the electromagnetic valve device 1 is equipped. The electromagnetic valve device 1 is an electromagnetic open/close valve that opens and closes a valve passage 3 formed in a housing 2 by a valve body 4. The guide body 5 is provided to the housing 2, and the valve body 4 fits in one axial direction end portion 12 of the guide body 5. A stationary magnetic pole body 6 made of a magnetic material is fixed to the other axial direction end portion of the guide body 5. A plunger 7 made of a magnetic material fits in the guide body 5 so that it is provided between the valve body 4 and the stationary magnetic pole body 6.

A coil 8 is provided so that it surrounds a portion of the guide body 5 on the side of the other axial direction end portion. A yoke 9 is provided so as to cover the coil 8 from radially outside and from the both sides in the axial direction. When an electric current is not supplied in the coil 8, the plunger 7 is pressed by a spring member 10 that is provided between the stationary magnetic pole body 6 and the plunger 7, thereby closing the valve body 4 and closing the valve passage 3. When an electric current is supplied in the coil 8, a magnetic circuit that passes through the stationary magnetic pole body 6, the plunger 7, and the yoke 9 is formed, and, then, the plunger 7 is magnetically fixed to the stationary magnetic pole body 6, thereby opening the valve body 4 and opening the valve passage 3.

In this electromagnetic valve device 1, when an electric current is supplied in the coil 8, since the plunger 7 is magnetically fixed to the stationary magnetic pole body 6, a magnetic circuit that passes through the guide body 5 in a portion at which the stationary magnetic pole body 6 and the plunger 7 oppose each other is undesirable and should not be formed. Therefore, a portion 11 of the guide body 5 that covers the portion at which the stationary magnetic pole body 6 and the plunger 7 oppose each other must be made of at least a nonmagnetic material. For this reason, the guide body 5 typically is entirely made of a nonmagnetic material.

Figure 3:
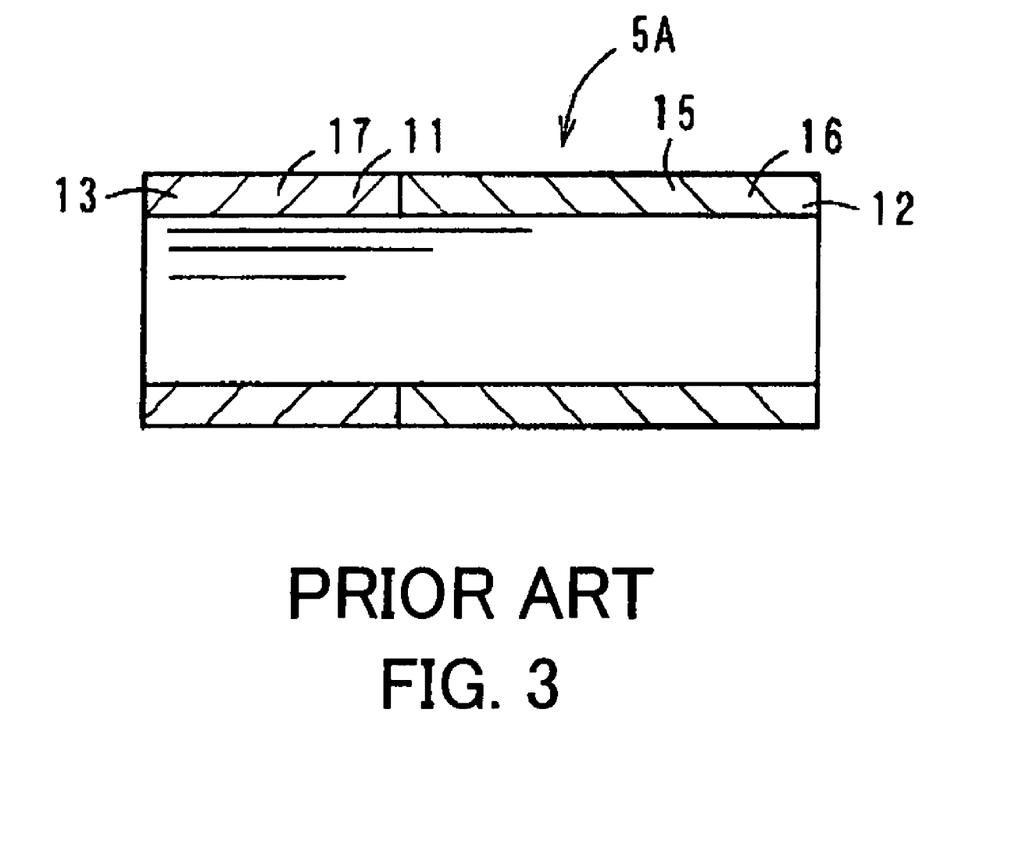
FIG. 3 is a cross-sectional view showing another prior art guide body.

FIG. 3 is a sectional view showing another prior art guide body 5A. The guide body 5A of FIG. 3 is similar to the guide body 5 of FIGS. 1 and 2. Therefore, similar reference numerals are assigned to corresponding portions to only explain different portions. Since the guide body 5 of FIGS. 1 and 2 is entirely a nonmagnetic material as mentioned above, there is a portion 15 of the guide body 5 that is made of a nonmagnetic material and that is positioned in the magnetic circuit which passes through the stationary magnetic pole body 6, the plunger 7, and the yoke 9. Therefore, the portion 15 adds resistance to the magnetic circuit, and a fixing force from the coil 8 that magnetically fixes the plunger 7 to the stationary magnetic pole body 6 becomes less. In order to resolve this inconvenience, in place of the guide body 5 shown in FIGS. 1 and 2, the guide body 5A shown in FIG. 3 must be used.

A portion 16 of this guide body 5A on the side of the one axial direction end portion is made of a magnetic material, and a portion 17 on the side of the other axial direction end portion is made of a nonmagnetic material. Therefore, the portion 11 that covers the portion at which the stationary magnetic pole body 6 and a plunger 7 oppose each other is made of a nonmagnetic material, and the portion 15 that is positioned in the magnetic circuit which passes through the plunger 7 and the yoke 9 is made of a magnetic material. Accordingly, the above-mentioned inconvenience can be resolved. Such a guide body 5A using the portion 16 made of a magnetic material, and the portion 17 made of a nonmagnetic material is shown, for example, in Japanese Laid-Open Patent Application No. 2002-231546.

In the guide body 5A shown in FIG. 3, the pulling force between the stationary magnetic pole body 6 and the plunger 7 can be increased as mentioned above. However, since the axial direction end portion 12, which serves as a portion for guiding the valve body 4, is also made of a magnetic material, metal powders that have entered into the valve body during operation of the electromagnetic valve body may be pulled to the axial direction end portion 12. In such a case, the metal powders may cause adverse effects, and there is a possibility of causing degradation of the seating characteristic over the seat of the valve body 4.

SUMMARY

The present invention relates to the above conditions, and provides a guide body that is capable of preventing the degradation of the seating characteristics of the valve body, with less magnetic resistance in the magnetic circuit.

According to one aspect of the invention, a guide body to be provided in an electromagnetic valve device is provided. The electromagnetic valve device includes a coil assembly including a coil disposed to surround the guide body, a stationary magnetic pole body that contacts a first end portion of the guide body, and a spring member, wherein a portion of lines of magnetic force formed by the coil passes through the stationary magnetic pole body. The electromagnetic valve device includes a plunger slidably disposed inside the guide body, and being driven by a magnetic force formed by the coil while resisting a biasing force of the spring member, and further includes a valve body that is attached to the plunger on a side opposite from the stationary magnetic pole body, wherein the guide body slidably guides the plunger and the valve body in an open/close direction of the valve body along a guide face thereof. The guide body includes a first nonmagnetic section that is made of a nonmagnetic material, and supports the stationary magnetic pole body and a part of the plunger at least at which the stationary magnetic pole body and the plunger oppose each other, a second nonmagnetic section that is made of a nonmagnetic material, and supports at least the valve body, wherein the second nonmagnetic portion extends at least throughout a sliding range of the valve body, and a magnetic section that is made of a magnetic material, and is intermediate the first and second nonmagnetic sections so that a portion of the lines of magnetic force formed by the coil passes therethrough. The guide face is formed so as to coaxially support the plunger and the valve body displaceable in the open/close direction.

According to this aspect of the invention, the guide body has less magnetic resistance, and a larger driving force can be obtained from the coil. Since the second section of the guide body that supports at least the valve body is made of a nonmagnetic material, it is possible to prevent the magnetic fixation of metal powders on the second portion. Thus, it is also possible to prevent degradation of seating characteristic and degradation of guiding characteristic of the valve body which are caused by adhering of the metal powders to the guide body, and achieve good control of opening/closing the valve passage.

The guide face may be formed with a uniform surface in the axial direction. Therefore, it is possible to guide the plunger and the valve body while holding them coaxially.

According to another aspect of the invention, a method of manufacturing the guide body may include a joining process where a magnetic member made of a magnetic material and nonmagnetic members made of a nonmagnetic material are joined so that the members are arranged in the axial direction. The method may include a guide face formation process where the guide face is formed by a surface treatment after the magnetic member and the nonmagnetic members are joined together. Therefore, it is possible to easily manufacture the guide body which achieves the above outstanding effects.

In the joining process, the magnetic member and the nonmagnetic member may be joined by friction welding. Therefore, it is possible to make the strength of the guide body greater. Further, it is possible to manufacture a guide body that is not easily damaged even if a pressure of fluid acts thereon.

According to still another aspect of the invention, an electromagnetic valve device includes a housing with which a valve passage is formed, a guide body, a coil assembly including a coil disposed to surround the guide body, a stationary magnetic pole body that contacts a first end portion of the guide body, and a spring member, wherein a portion of lines of magnetic force formed by the coil passes through the stationary magnetic pole body, a plunger slidably disposed inside the guide body, and being driven by a magnetic force formed by the coil while resisting a biasing force of the spring member, and a valve body that is attached to the plunger on a side opposite from the stationary magnetic pole body. The guide body slidably guides the plunger and the valve body in an open/close direction of the valve body along a guide face thereof so that the valve body changes an opening of the valve passage. The guide body includes a first nonmagnetic section that is made of a nonmagnetic material, and supports the stationary magnetic pole body and a part of the plunger at least at which the stationary magnetic pole body and the plunger oppose each other, a second nonmagnetic section that is made of a nonmagnetic material, and supports at least the valve body, wherein the second nonmagnetic portion extends at least throughout a sliding range of the valve body, and a magnetic section that is made of a magnetic material, and is intermediate the first and second nonmagnetic sections so that a portion of the lines of magnetic force formed by the coil passes therethrough. The guide face is formed so as to coaxially support the plunger and the valve body displaceable in the open/close direction.

By the foregoing, it is possible to realize an electromagnetic valve device equipped with the guide body which achieves the above-mentioned outstanding effects.

BRIEF DESCRIPTION OF THE DRAWINGS

The disclosure is illustrated by way of example and not by way of limitation in the figures of the accompanying drawings, in which the like reference numerals indicate similar elements and in which.

DETAILED DESCRIPTION

Figure 4:
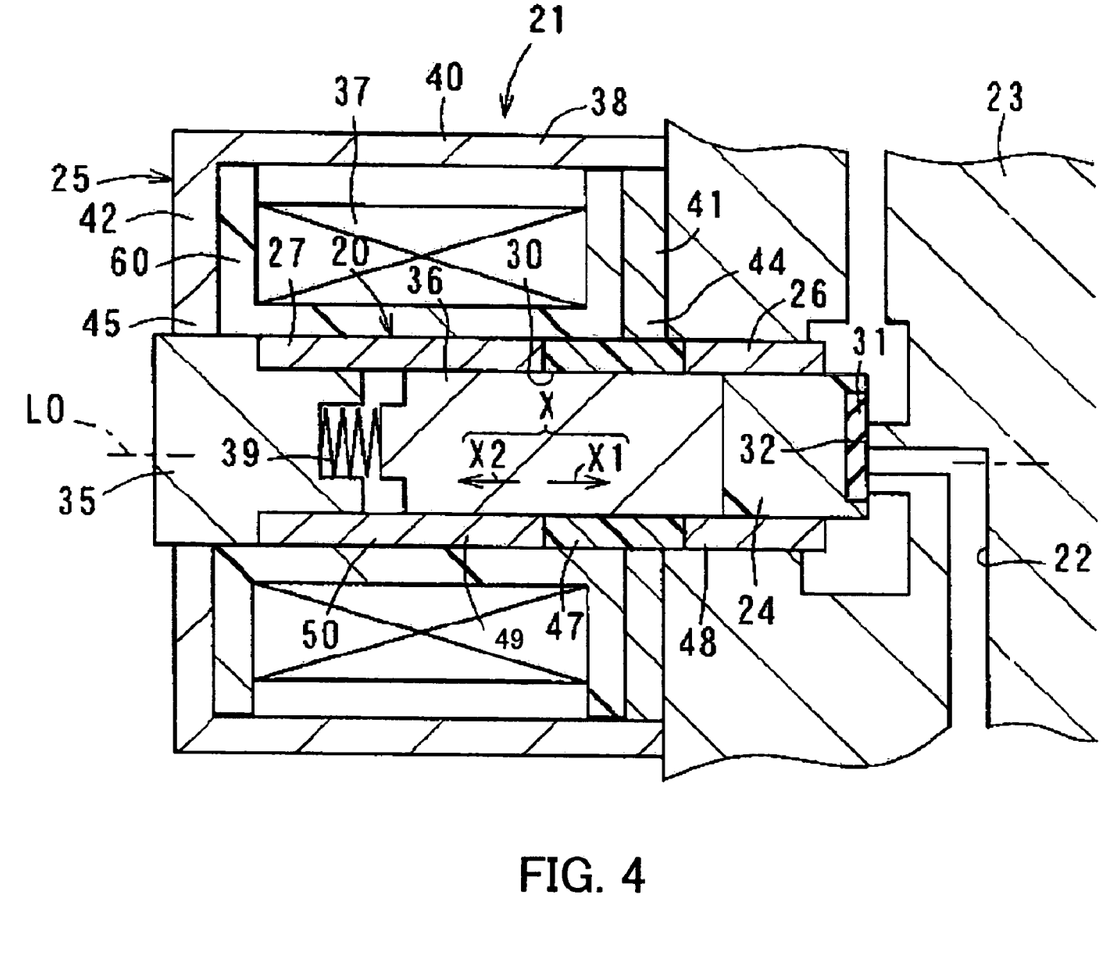
FIG. 4 is a cross-sectional view showing an electromagnetic valve device equipped with a guide body according to a first embodiment of the invention.

FIG. 4 is a cross-sectional view showing an electromagnetic valve device 21 equipped with a guide body 20 according to a first embodiment of the invention. The electromagnetic valve device 21 is an electromagnetic open/close valve for opening and closing a valve passage 22 and is utilized, for example, for fluid control in a fluid pressure system, such as a drive system for construction or industrial machinery. Fluid includes liquids such as operating oil and operating water, and gas such as operating air, for example. The electromagnetic valve device 21 is configured to include a housing 23, a guide body 20, a valve body 24, and a drive module (including a coil assembly) 25.

The valve passage 22 is formed in the housing 23 to be used as a fluid passage. The guide body 20 typically is a tubular cylinder in which both ends are opened. This guide body 20 is formed coincidental with a reference axial-center line L0 which defines an axial center of the guide body 20. The guide body 20 is partially inserted into the housing 23 from a first end portion 26 in a first axial direction X1 along the reference axial-center line L0, and is held inside the housing 23. The first end portion 26 of the guide body 20 opens so that it faces an intermediate portion of the valve passage 22. A second end portion 27 of the guide body 20 in the second axial direction X2 protrudes from the housing 23. Where referring to the both axial directions X1 and X2, it is referred to as an axial direction X.

The valve body 24 typically is of a cylindrical shape. The valve body 24 is at least partially fitted into the first end portion 26 of the guide body 20, and is coaxially supported by the guide body 20. The guide body 20 includes a uniform guide face 30 throughout in the axial direction X, which is an inner circumferential surface of the guide body 20. The guide face 30 supports an outer circumferential surface of the valve body 24, and guides the valve body 24 so that it is possible to be displaced in the axial direction X. A seat portion 31 is formed in an end portion of the valve body 24 in the first axial direction X1. The valve passage 22 can be closed by the seat portion 31 seating the seat 32 of the housing 23, and the valve passage 22 can be opened by the seat portion 31 being spaced from the seat 32.

The first axial direction X1 is a direction to which the seat portion 31 approaches the seat 32, and is herein referred to as "a closing direction." The second axial direction X2 is a direction in which the seat portion 31 moves away from the seat 32, and herein, referred to as "an opening direction." When referring to the both directions X1 and X2, it is referred to as an opening-and-closing direction X. Therefore, the valve body 24 changes an opening of the valve passage 22 by being displaced in the opening-and-closing direction X.

In this embodiment, the drive module (including a coil assembly) 25 includes a stationary magnetic pole body 35, a plunger 36, a coil 37, a yoke body 38, and a spring member 39.

The drive module (including the coil assembly) 25 may be such that it drives the plunger 36 with a magnetic force formed by the coil 37, and drives the valve body 24 to displace it in the opening-and-closing direction X.

The stationary magnetic pole body 35 is attached to the second end portion 27 of the guide body 20 so that its portion on the side of the first axial direction X1 is partially inserted into the second end portion 27. The plunger 36 typically is of a cylindrical shape, and is fitted into the guide body 20 between the valve body 24 and the stationary magnetic pole body 35 so that it is supported coaxially with the guide body 20 and the valve body 24. In this embodiment, the plunger 36 is formed approximately in the same outside diameter as that of the valve body 24, and an outer circumferential surface thereof is supported by the guide face 30 so that the plunger 36 is guided displaceable in the axial direction X.

The coil 37 is wound and held around a coil holder 60. The coil 37 is fitted on a portion of the guide body 20 that protrudes from the housing 23 so that it surrounds the portion of the guide body 20. The yoke body 38 includes a peripheral wall portion 40 that covers the coil 37 from radially outside, and end wall portions 41 and 42 that cover the coil 37 from both sides in the axial direction X. An inner circumferential portion 44 of the first end wall portion 41 that covers the coil 37 in the second axial direction X2 opposes an outer circumferential portion of the guide body 20 (in this embodiment, it contacts the outer circumferential portion of the guide body 20). An inner circumferential portion 45 of the second end wall portion 42 that covers the coil 37 in the first axial direction X1 opposes an outer circumferential portion of the stationary magnetic pole body 35 (in this embodiment, it contacts the outer circumferential portion of the guide body 20).

A spring member 39, which may be realized by a compression coiled spring, is provided between the stationary magnetic pole body 35 and the plunger 36. Therefore, a spring force in the closing direction X1 is given to the plunger 36 by the spring member 39. This spring force is transmitted to the valve body 24 through the plunger 36.

Figure 5:
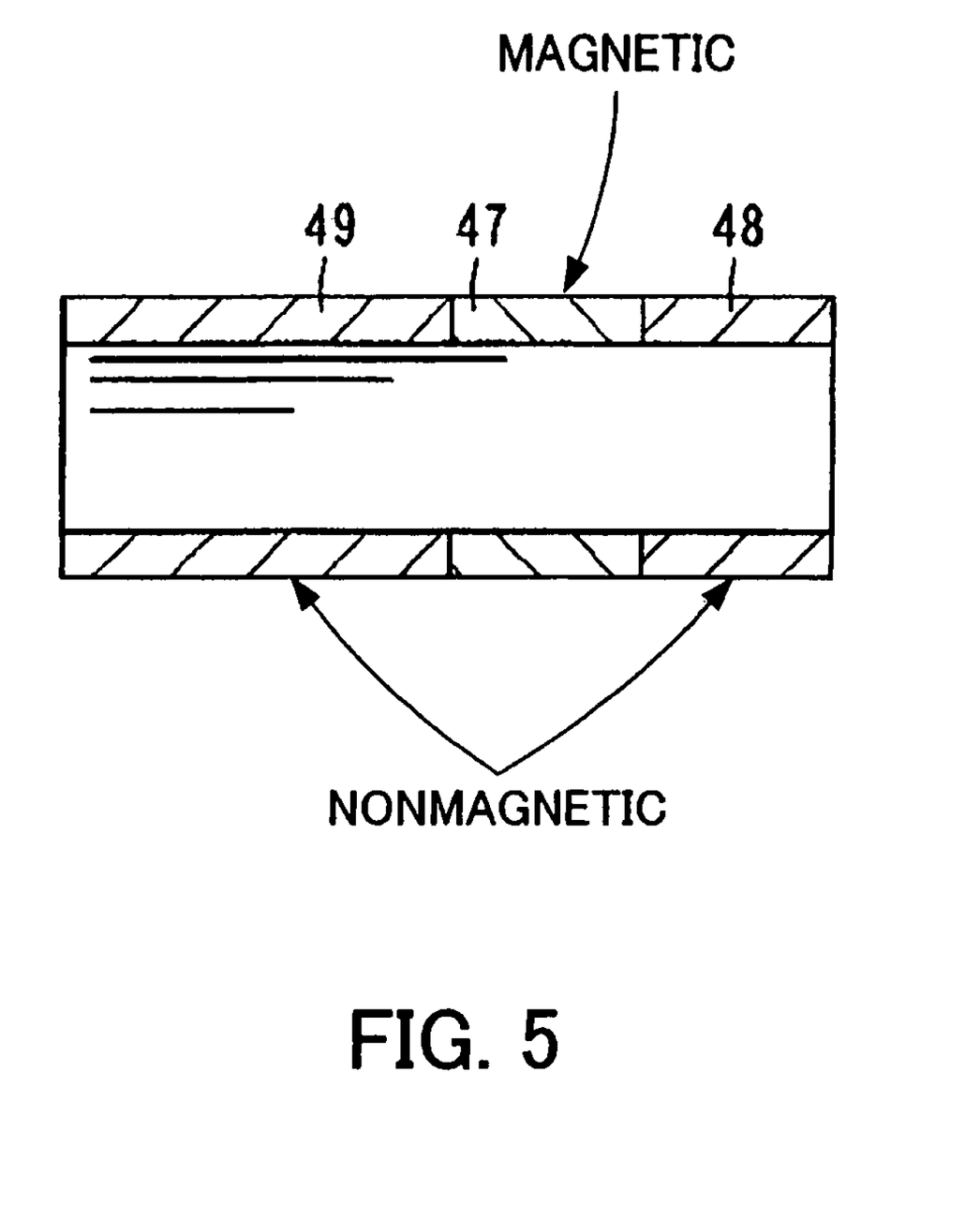
FIG. 5 is a cross-sectional view showing the guide body of FIG. 4.

Also referring to FIG. 5, which is a cross-sectional view showing the guide body 20, the valve body 24 and the coil holder 60, among components which constitute the electromagnetic valve device 21, are made of a nonmagnetic material, and the other components, namely, the stationary magnetic pole body 35, the plunger 36, and the yoke body 38 are made of a magnetic material. Moreover, an intermediate section 47 of the guide body in the axial direction is made of a magnetic material, and the remaining sections 48 and 49 of the guide body 20 on the both sides in the axial direction are made of a nonmagnetic material.

The intermediate section 47 of the guide body 20 that is made of the magnetic material is a proximity portion including the position at which the inner circumferential portion 44 of the first end wall portion 41 of the yoke body 38 contacts. Among the remaining sections 48 and 49 other than the magnetic intermediate section 47, the section 48 on the side in the first axial direction X1 is a portion corresponding to the first axial direction end portion 26 of the guide body 20, and is a portion that supports and guides the valve body 24. The portion 49 on the side in the second axial direction X2, among the remaining sections 48 and 49 other than the magnetic intermediate section 47, includes a portion at which the stationary magnetic pole body 35 and the plunger 36 oppose each other, that is, includes a portion 50 that surrounds an end portion of the stationary magnetic pole body 35 in the first axial direction X1 and an end portion of the plunger 36 in the second axial direction X2.

The magnetic material may be magnetic metal, for example, carbon steel, or stainless steel (SUS630) that has magnetic properties. Moreover, the nonmagnetic material may be synthetic resin or nonmagnetic metal. The nonmagnetic metal may be stainless steel (SUS316, SUS304) that does not have magnetic properties. Where the stationary magnetic pole body 35 is made of a ferrous metal, it may be referred to as "a stationary iron core", and where the plunger 36 is made of ferrous metal, it may be referred to as "a movable iron core."

Figure 6:
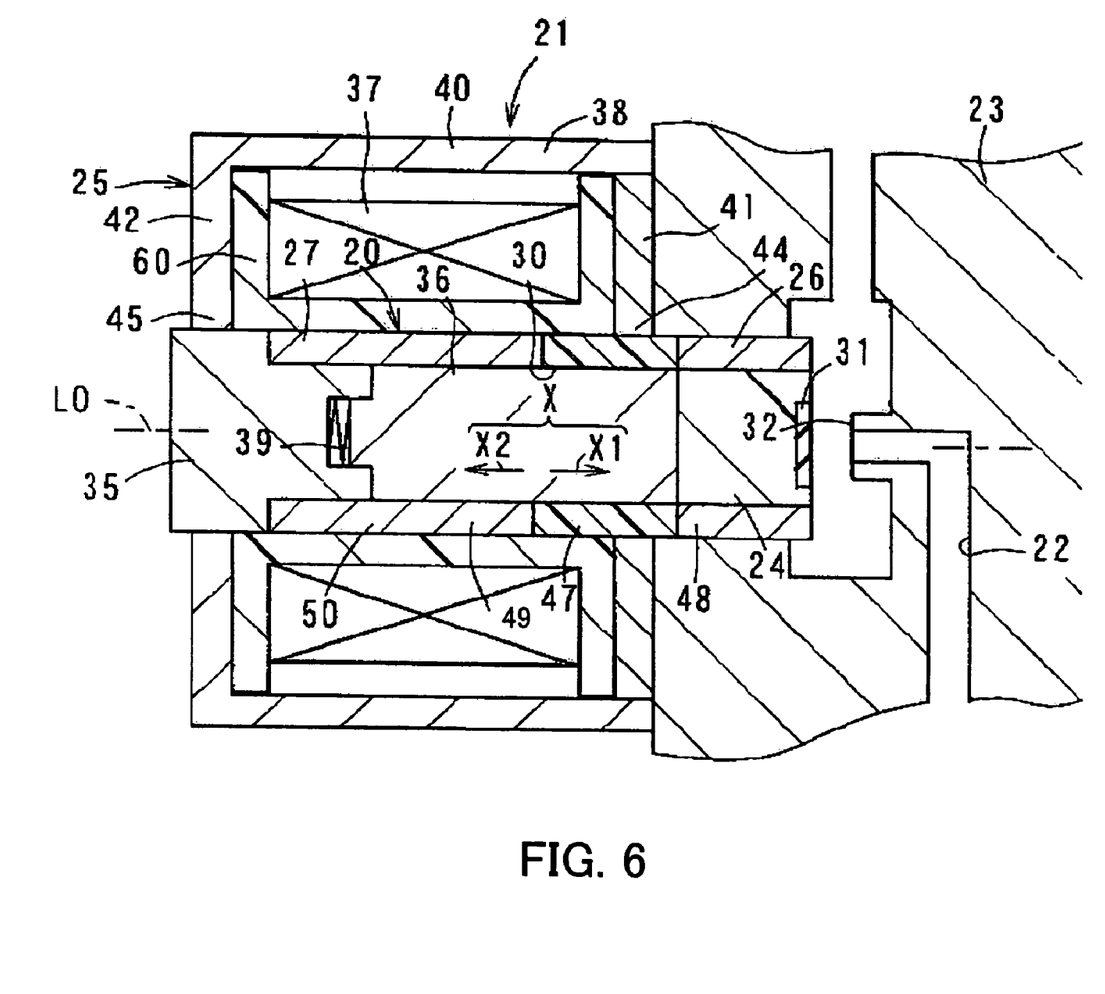
FIG. 6 is a cross-sectional view of the electromagnetic valve device shown as a valve passage of FIG. 4 is opened.

FIG. 6 is a cross-sectional view of the electromagnetic valve device 21 shown as the valve passage 22 is opened. For such an electromagnetic valve device 21, when the coil 37 is in a non-current-supplied state in which an electric current is not supplied in the coil 37, since the spring force of the spring member 39 is transmitted to the valve body 24 through the plunger 36, as shown in FIG. 4, the valve body 24 is pressed in the closing direction X1, the seat portion 31 of the valve body 24 seats the seat 32 and, thus, the valve passage 22 is closed.

On the other hand, when the coil 37 is in a current-supplied state in which an electric current is supplied in the coil 37, the plunger 36 is magnetically fixed to the stationary magnetic pole body 35. More particularly, a magnetic circuit is formed so that the lines of magnetic force of the generated magnetic field pass through the stationary magnetic pole body 35, the plunger 36, and the yoke body 38. Thus, the stationary magnetic pole body 35 and the plunger 36 are magnetized, and the plunger 36 is then magnetically fixed to the stationary magnetic pole body 35 while resisting the spring force of the spring member 39. Therefore, as shown in FIG. 6, the seat portion 31 of the valve body 24 moves away from the seat 32 resisting the spring force transmitted to the valve body 24 and, thus, the valve passage 22 is opened.

In the electromagnetic valve device 21 of this embodiment, the portion of the guide body 20 that crosses the magnetic circuit is in a course of passage of the lines of magnetic force of the magnetic field formed by the coil 37. That is, the section 47, including the position at which the inner circumferential portion 44 of the first end wall portion 41 of the yoke body 38, is made of a magnetic material. Therefore, the guide body 20 has less magnetic resistance in the magnetic circuit, and it is possible to obtain a larger driving force from the coil 37.

On the other hand, the section 48 of the guide body 20 that supports the valve body 24 is made of a nonmagnetic material, and the valve body 24 is also made of a nonmagnetic material. Thus, it is possible to prevent magnetic fixation and adherence of the metal powders, etc., that have entered into the electromagnetic valve device during operation, to the portion 26 that supports the valve body 24. Therefore, it is possible to prevent degradation of seating characteristics and degradation of guiding characteristics of the valve body 24 by the adhesion of the metal powders and, as a result, a good open/close control of the valve passage 22 is achieved.

As described above, the guide body 20 can prevent the degradation of the seating characteristic and the degradation of the guiding characteristic of the valve body 24, with less magnetic resistance. Therefore, the electromagnetic valve device 21 can quickly drive the valve body 24 with a small coil, and is capable of highly precise open/close control.

Further, the remaining sections 48 and 49 other than the magnetic intermediate section 47 that crosses the course of passage of the lines of magnetic force of the guide body 24, are made of a nonmagnetic material, which prevents forming of a magnetic circuit that passes through these remaining sections 48 and 49. Therefore, the magnetic circuit may be formed so that it certainly passes through the stationary magnetic pole body 35 and the plunger 36. Thus, a larger driving force for driving the plunger 36 can be obtained.

Moreover, in this embodiment, the guide face 30 of the guide body 20 that supports the plunger 36 and the valve body 24 is a uniform cylindrical surface in the axial direction, and can guide the plunger 36 and the valve body 24 while coaxially holding them. For example, if an inner surface of the intermediate section 47 through which the course of passage of the lines of magnetic force crosses, and the inner surfaces of the remaining sections 48 and 49 are relatively offset to form different virtual cylindrical surfaces, a concentricity between the plunger 36 and the valve body 24 is reduced, and it may become impossible to realize smooth guiding with the guide face 30. On the other hand, if the guide face 30 is uniform, the plunger 36 and the valve body 24 can be guided on the same cylinder surface, the concentricity between the plunger 36 and the valve body 24 can be greater, and smooth guiding can be realized.

Figure 7:
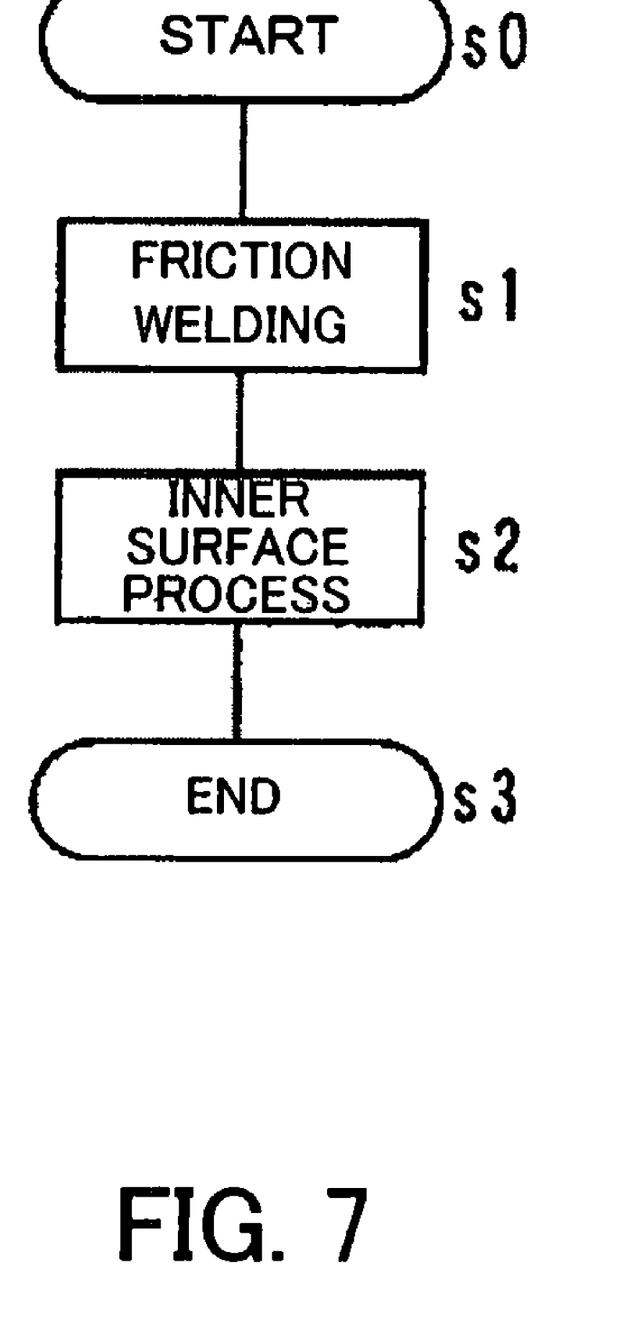
FIG. 7 is a flowchart showing a procedure of manufacturing the guide body of FIG. 4, according to a manufacturing method of the invention.

FIG. 7 is a flowchart showing a procedure of manufacturing the guide body 20 according to a manufacturing method of the invention. Upon manufacturing the guide body 20, first, at a joining process of Step s1, a cylindrical magnetic member made of a magnetic material and cylindrical nonmagnetic members made of a nonmagnetic material are aligned in the axial direction, and then joined. More specifically, nonmagnetic members made of a nonmagnetic material are arranged on the both sides of a magnetic member that forms the intermediate section made of a magnetic material, so that they may be in the same arrangement as that of the section 47 made of the magnetic material and the sections 48 and 49 made of the nonmagnetic material, to manufacture the guide body 20. Then, the ends of the members are pressed together while the members are relatively revolved, that is, the members are friction welded.

Next, at a guide face forming process of Step s2, an inner circumferential surface of the joined product including the magnetic member and the nonmagnetic members is surface treated, to form a cylindrical inner circumferential surface. The surface treatment may be cutting, grinding processing, etc. As the surface treatment is carried out, the guide body 20 is manufactured so that the guide face 30 thereof constitutes a smooth and continuous inner circumferential surface.

According to such a manufacturing method, it is possible to easily manufacture the guide body 20 where the intermediate section 47 in the axial direction is made of a magnetic material, and the remaining sections 48 and 49 are made of a nonmagnetic material, and that can achieve the above desired effects. Since the inner circumferential surface is processed to complete the guide face 30 especially after joining, it is possible to form the guide face 30 that is uniform in the axial direction, and manufacture the guide body 20 with good guiding characteristics.

Moreover, upon joining the magnetic member and the nonmagnetic members, since the friction welding is carried out, it is possible to make the strength of the guide body 20 greater, compared with arc welding, etc. Therefore, a guide body that is difficult to damage even when a pressure of fluid acts on the guide body can be manufactured.

In each of the above-mentioned embodiments is merely an illustration of the invention, and can suitably modify its configuration within the scope of the invention. For example, the magnetic material and the nonmagnetic material are not limited to the above-mentioned materials, and any other suitable materials may be used. Moreover, although it has been described as the electromagnetic valve device 21 is a normally-open-type open/close valve that closes the valve passage when an electric current is supplied in the coil 37, it may be implemented in a normally-closed-type open/close valve that closes the valve passage when an electric current is supplied in the coil 37. Furthermore, without limiting to open/close valves, it may be implemented in other valve devices, such as a channel direction control valve, a flow control valve, a pressure control valve, etc. Thus, the applications of the electromagnetic valve device are also not limited to the above-mentioned application.

Moreover, the guide body 20 should not be limited to what is formed by joining independent members as mentioned above. For example, the cylindrical body may be formed by using semi-austenitic steel, which shows magnetism in a normal state and shows non-magnetism after being annealed, and by annealing only a portion of the semi-austenitic steel to be nonmagnetic to form the guide body 20.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring and nor excluding two or more such elements. Other combinations and subcombinations of features, functions, elements, and/or properties may be claimed through amendment of the present claims or through presentation of new claims in this or a related application. Such claims and whether broader, narrower, equal, or different in scope to the original claims, also are regarded as included within the subject matter of the present disclosure.

What is claimed is:

1. A guide body to be provided in an electromagnetic valve device, wherein the electromagnetic valve device includes:
   a coil assembly including a coil disposed to surround the guide body, a stationary magnetic pole body that contacts a first end portion of the guide body, and a spring member, wherein a portion of lines of magnetic force formed by the coil passes through the stationary magnetic pole body;
   a plunger slidably disposed inside the guide body, and being driven by a magnetic force formed by the coil while resisting a biasing force of the spring member; and
   a valve body that is attached to the plunger on a side opposite from the stationary magnetic pole body;
   wherein the guide body slidably guides the plunger and the valve body in an open/close direction of the valve body along a guide face thereof;
   the guide body comprising:
   a first nonmagnetic section that is made of a nonmagnetic material, and supports the stationary magnetic pole body and a part of the plunger at least at which the stationary magnetic pole body and the plunger oppose each other;
   a second nonmagnetic section that is made of a nonmagnetic material, and supports at least the valve body, wherein the second nonmagnetic portion extends at least throughout a sliding range of the valve body; and
   a magnetic section that is made of a magnetic material, and is intermediate the first and second nonmagnetic sections so that a portion of the lines of magnetic force formed by the coil passes therethrough;
   wherein the guide face is formed so as to coaxially support the plunger and the valve body displaceable in the open/close direction.

2. The guide body of claim 1, wherein the guide face is formed in a uniform surface in the axial direction.

3. A method of manufacturing the guide body of claim 1, including:
   joining a magnetic member made of a magnetic material and nonmagnetic members made of a nonmagnetic material so that the members are arranged in the axial direction; and
   forming the guide face by a surface treatment after the magnetic member and the nonmagnetic members are joined together.

4. The method of claim 3, wherein the magnetic member and the nonmagnetic member are joined by friction welding.

5. An electromagnetic valve device, comprising:
   a housing with which a valve passage is formed;
   a guide body;
   a coil assembly including a coil disposed to surround the guide body, a stationary magnetic pole body that contacts a first end portion of the guide body, and a spring member, wherein a portion of lines of magnetic force formed by the coil passes through the stationary magnetic pole body;
   a plunger slidably disposed inside the guide body, and being driven by a magnetic force formed by the coil while resisting a biasing force of the spring member; and
   a valve body that is attached to the plunger on a side opposite from the stationary magnetic pole body;
   wherein the guide body slidably guides the plunger and the valve body in an open/close direction of the valve body along a guide face thereof so that the valve body changes an opening of the valve passage;
   wherein the guide body includes:
   a first nonmagnetic section that is made of a nonmagnetic material, and supports the stationary magnetic pole body and a part of the plunger at least at which the stationary magnetic pole body and the plunger oppose each other;
   a second nonmagnetic section that is made of a nonmagnetic material, and supports at least the valve body, wherein the second nonmagnetic portion extends at least throughout a sliding range of the valve body; and
   a magnetic section that is made of a magnetic material, and is intermediate the first and second nonmagnetic sections so that a portion of the lines of magnetic force formed by the coil passes therethrough;
   wherein the guide face is formed so as to coaxially support the plunger and the valve body displaceable in the open/close direction.

* * * * *